United States Patent [19]
Becker

[11] Patent Number: 5,944,655
[45] Date of Patent: Aug. 31, 1999

[54] 3D ENDOSCOPE WITH OPTICAL SWITCH AND PRISM ARRANGEMENT

[75] Inventor: Heinz Becker, Bruchsal, Germany

[73] Assignee: Forschunjszentrum Karlsruhe GmbH, Karlsruhe, Germany

[21] Appl. No.: 08/779,491

[22] Filed: Jan. 7, 1997

Related U.S. Application Data

[63] Continuation-in-part of application No. PCT/EP95/01922, May 19, 1995.

[30] Foreign Application Priority Data

Jul. 8, 1994 [DE] Germany .............................. 44 24 114

[51] Int. Cl.$^6$ .................................................... A61B 1/002
[52] U.S. Cl. ............................................ 600/166; 600/111
[58] Field of Search ..................................... 600/111, 166; 359/462

[56] References Cited

U.S. PATENT DOCUMENTS

| | | |
|---|---|---|
| 3,520,587 | 7/1970 | Tasaki ...................................... 600/166 |
| 4,862,873 | 9/1989 | Yajima et al. . |
| 4,924,853 | 5/1990 | Jones, Jr. et al. . |

FOREIGN PATENT DOCUMENTS

| | | |
|---|---|---|
| 0 222 293 | 5/1987 | European Pat. Off. . |
| 0 269 075 | 6/1988 | European Pat. Off. . |
| 38 06 190 | 9/1988 | Germany . |
| 4016812 | 1/1992 | Japan ...................................... 600/166 |
| 5341207 | 12/1993 | Japan . |
| 1318970 | 6/1987 | U.S.S.R. ............................. 600/166 |
| WO 87/01896 | 3/1987 | WIPO . |

Primary Examiner—John P. Leubecker
Attorney, Agent, or Firm—Klaus T. Bach

[57] ABSTRACT

In a 3D video endoscope, two lenses are disposed at the front end of a shank portion at a certain squint angle providing for two separate beam paths in each of which an optical switch is disposed and the switches are so controlled that they are alternately transparent and opaque, one being transparent, while the other is opaque, and a beam deflection arrangement is disposed in the beam paths for directing the beams along a single axis into an opto-electronic camera which provides electrical output signals representing alternately the pictures generated by the two front lenses.

1 Claim, 3 Drawing Sheets

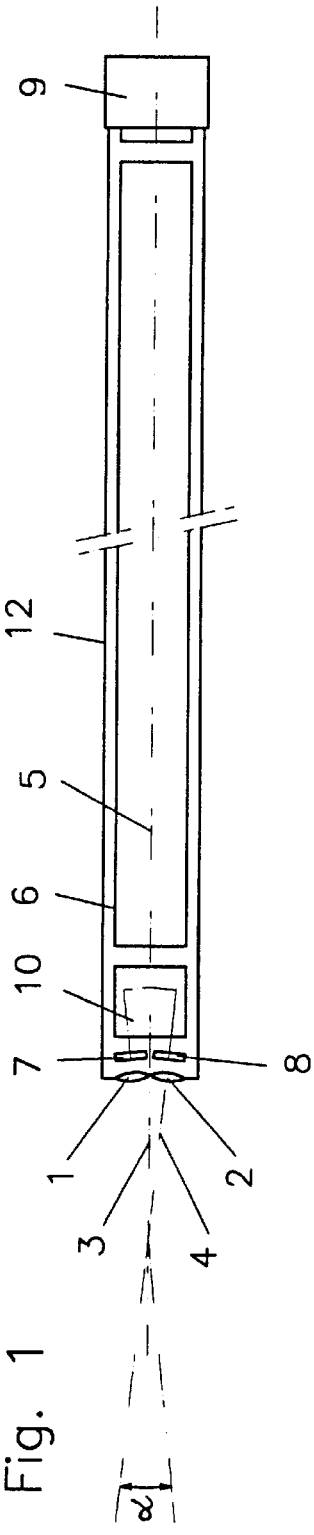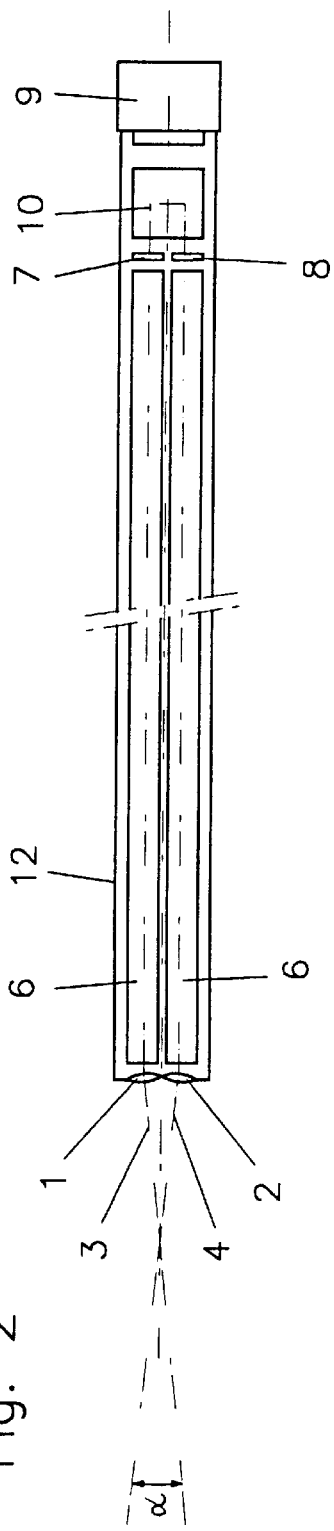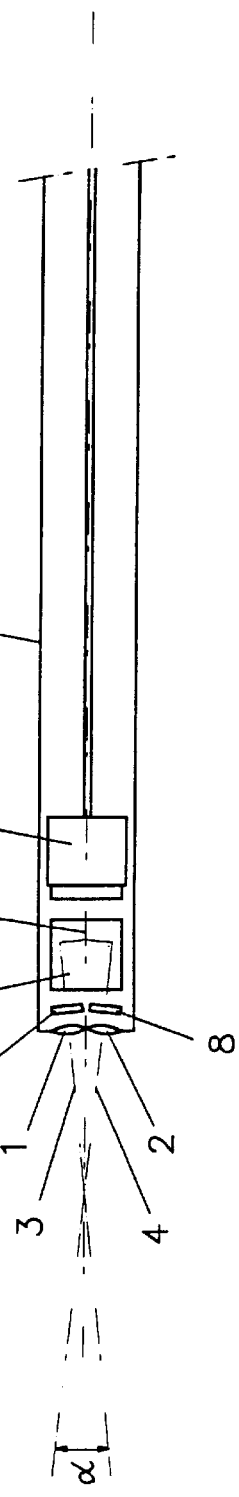

3D ENDOSCOPE WITH OPTICAL SWITCH
AND PRISM ARRANGEMENT

This is a Continuation-in-Part application of International Patent Application PCT/EP95/01922 filed May 19, 1995 and claiming priority of German Patent Application P 44 24 114.3 filed Jul. 8, 1994.

BACKGROUND OF THE INVENTION

The present invention relates to a 3D-video endoscope with two optical inputs and an electrical output for a video signal which permits the user to view, in three dimensional fashion, areas in cavities which are not readily accessible.

DE 38 06 190 discloses a 3D-video system with continuous two channel imaging and image reproduction by way of a polarizing device. The 3D-video system has in each optical channel only one beam deflection arrangement so that it provides only a mirror-reversed image of the object being viewed. The polarization equipment further permits only slight tilting of the head from a predetermined position during viewing of the monitor.

DE 36 40 731 on the other hand, discloses an opto-electronic 3D-video recording system with optical valves arranged immediately in front of the eyes of a viewer. The optical axis of the lenses form the convergence angle or squint angle which is essential for 3-dimensional viewing with depth perception. Each beam is deflected twice by mirrors or prisms before it reaches the optical input of one of the video cameras. Consequently, actual pictures, not mirror reversed pictures are reproduced. In each of the two beam paths, there is an optical valve so that alternately, the left and right pictures are permitted to pass. The receiving capacity of the respective video camera is always exclusively available for the pictures transmitted by the respective channel.

The publication of the company OPTIKON published in 1993 describes a complete and usable 3D video system for endoscopic surgery, which is equipped in principle exactly like the system described in the publication above, with two optical channels. In front of each of the two beam entrance surfaces of the two channels, there is provided an ancillary lens by which the area in front of it is depicted. Each optical channel leads to a CCD camera which is mounted onto the proximal end. The camera controls are connected to a 3D electronic system by which the pictures of the two cameras are represented on a monitor with a time switch at a frequency of 100–120 Hz.

Consequently, a 3D-video endoscope design comprises two optical channels with ancillary lenses disposed in a shank and two cameras or camera heads mounted on this shank for receiving the pictures of the two lenses.

It is the object of the present invention to provide a 3D-video endoscope which is slim without detrimental effects to the picture quality and which is of a space saving design particularly at the point of the opto-electronic transition so that it can pass through narrow passage areas.

SUMMARY OF THE INVENTION

In a 3D-video endoscope, two lenses are disposed at the front end of a shank portion at a certain squint angle providing for two separate beam paths in each of which an optical switch is disposed wherein the switches are so controlled that they are alternately transparent and opaque, one being transparent, while the other is opaque, and a beam deflection arrangement is disposed in the beam paths for directing the beams along a single axis into an opto-electronic camera which provides electrical output signals representing alternately the scenes seen by the two front lenses.

The object results mainly from the intended use in minimally invasive surgery, but the invention could of course be used in connection with various areas of hollow space inspection. If used, for example for the inspection of channel systems or inaccessible tube systems, the 3D recording system will provide for a true spatial representation of the scene.

With the arrangement according to the invention, only the front lenses and the two controllable optical switches are arranged in pairs in the beam path. In any case, it is important that only one camera head is needed. The single camera head has outputs for the electrical signals to the video processing equipment, that is the electrical signals are transmitted by cables disposed in the shank. In this way, no optical transmission structures are needed and the shank can have any shape; it can be rigid, flexible or kinked.

In any case, the beam is twice reflected such that a conformal representation of the viewing area is obtained.

Both versions of the beam deflection arrangement 10 represent a kind of economy version. Generally, the principle of double reflection is utilized for each beam path. However, only one of the beam paths needs to be provided with a double reflection arrangement, whereas the other beam is passed only through a semitransparent mirror whereby the picture is not side reversed by but it loses some intensity. The one sided intensity attenuation may be compensated for to some degree by a particular mirror coating but a certain compensation can be obtained in an inexpensive manner also by electronic means.

As optical switches, electro-optical diaphragms have been found to be advantageous since they can be controlled in a simple and reliable manner by way of the camera head. In this manner, a secure coordination between the left and the right pictures (video half picture can be established.

The endoscope according to the invention is space saving and substantially less expensive than endoscopes presently available since the system uses only one camera and since the expense for signal processing arrangements is substantially reduced as the partial pictures are processed in sequence. Endoscopes according to the present invention are very slim in design especially in the proximal area since there are no voluminous building components in that area. The single necessary camera head is a spatially small component, that is, a so-called CCD chip. The endoscope is connected to a suitably powerful 3D electronic processing system in a manner as it has been shown in connection with DE 38 08 969.

All the single components of the 3D endoscope are known in one way or another from state-of-the-art 3D endoscopes and can be used in the arrangement according to the invention so that there is no need for the development of new components. The arrangement according to the invention however requires the installation of two optical switches which are also called optical valves or shutters. These optical switches themselves are also of a common design and are shown therefore in the drawing only schematically.

The invention will be described below on the basis of the accompanying drawings.

BRIEF DESCRIPTION OF THE DRAWINGS

FIG. 1 shows a 3D video endoscope with an electrical transmission channel disposed in the endoscope shank.

FIG. 2 shows the beam deflection by a V or Y type prism and,

FIG. 3 shows the beam deflection by way of a 90° prism.

DESCRIPTION OF A PREFERRED EMBODIMENT

Figure 4:
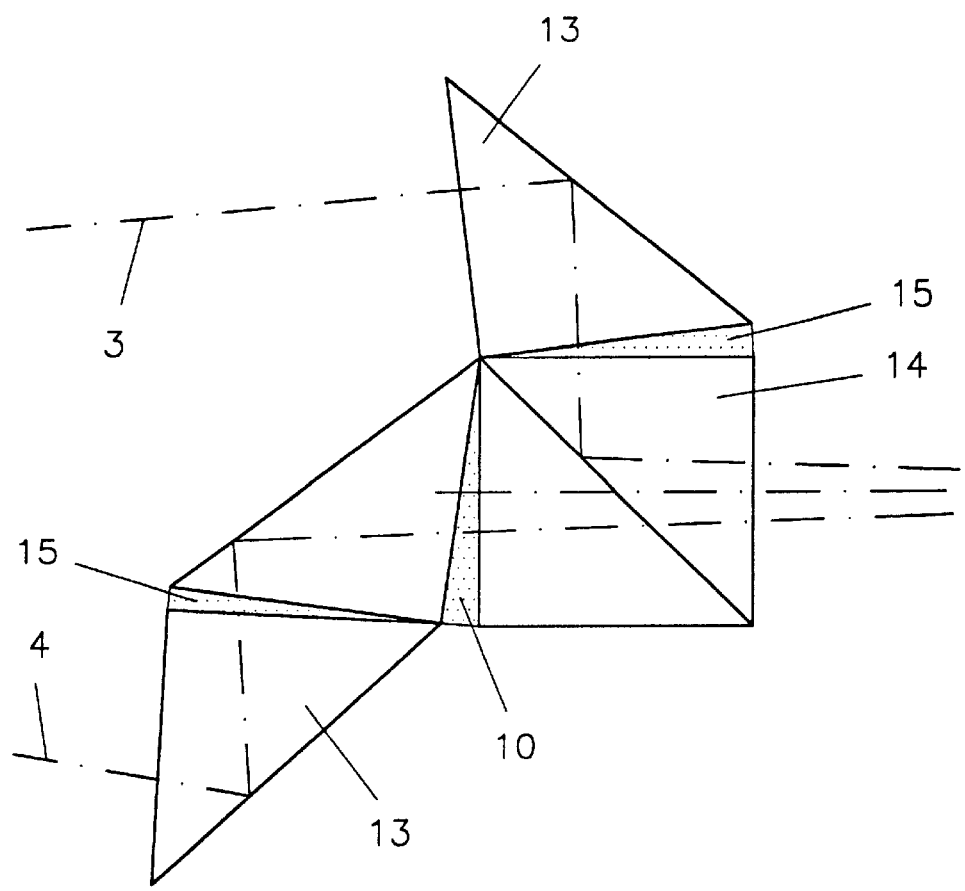
FIG. 4 shows an arrangement with 90° prisms for both beams.

The embodiment of the invention with two optical channels as shown in FIG. 1, which is considered for gynecological applications, consists of the two front lenses 1 and 2 for observation of an object. The front lenses are disposed next to each other at a distance of 2.7 mm and their optical axes 3, 4 extend in a common plane and intersect at a predetermined convergence or squint angle α, which depends on the desired 3D impression. The lenses 1, 2 in the present embodiment have a diameter of 2.7 mm so that the optical input of the endoscope has an outer diameter of about 6.5 mm. Smaller diameters are desirable for endoscopes intended for use in neurosurgery or arthroscopy.

In the respective beam paths 3 and 4, right behind the front lenses 1 and 2, there are the optical switches 7, 8. In the embodiment shown herein, the optical switches 7 and 8 are electro-optical diaphragms which are controlled at a frequency of 100 or, respectively, 120 Hz to be alternatingly transparent and opaque. For a reliable and accurate coordination, they are controlled by a camera head 9 by way of which the pictures are alternately transmitted.

After the two electro-optical switches or diaphragms 7, 8, there is the beam deflecting structure 10 through which only half a picture is passed on to the single camera that is, the picture of only one of the lenses, 9 of the endoscope at one time. This camera is a CCD (Charge Coupled Device) camera. By this camera, a picture entering the camera at the entrance area is divided up into picture elements (pixels). For a reliable coordination of the half pictures, the control for the diaphragms 7 and 8 is directly synchronized with the CCD camera 9. The further electronic processing of picture signals so obtained may be the same as the one described for example in DE 38 08 969.

The chip of such a CCD camera with a size of 6×4 mm (⅓" chip) has a total of 400,000 picture points, of which according to today's video standards at least 200,000 are utilized for the composition of the picture.

FIG. 4 shows the principle of beam deflection arrangement by prisms 13, 14.

Both design variations of the 3D video endoscope with optical channels 6 according to FIGS. 1 and 2 provide, in principle, pictures of the same quality since the recording procedure by the camera and the diaphragm control are identical. The shank 12 may also include other equipment such as illumination and/or suction and flushing equipment as far as the available space permits and the shank design is not overly complicated thereby if such combinations are desired.

The electrical signals at the output of the camera head 9 are transmitted by way of an electrical connecting line extending through the shank 12 having an axis 5 and are composed on a monitor to form a 3D picture of the scene.

Whether the shank 12 is stiff or flexible depends on the intended application. The advantage of the transmission of electrical signals through the shank 12 resides in the unproblematic electrical signal transmission. The shank 12 is mechanically strong and does not require careful treatment. The shank may be highly flexible and have a small bending radius capability without the risk of losing picture pixels in the transmission as this may happen with picture-transmitting fiber bundles with small bending radii by breakage of particular fibers. A shank can therefore easily be bent at certain points by predetermined angles α without particular design considerations.

Figure 5:
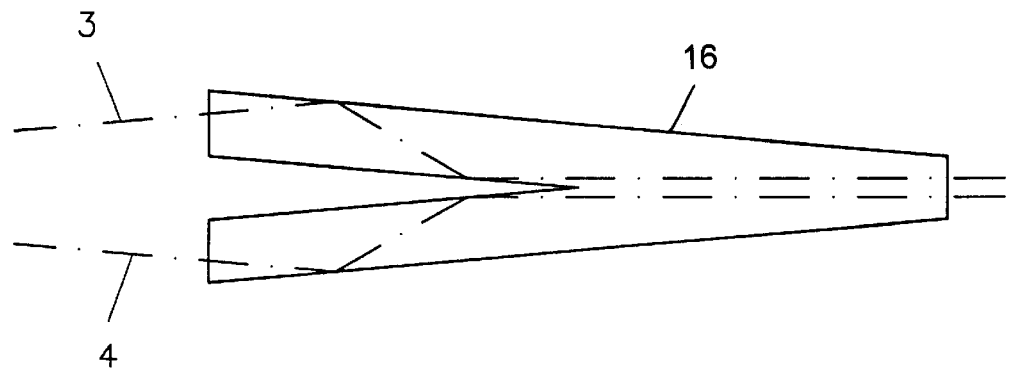
FIG. 5 shows a V or Y-type prism.

As shown in FIG. 5, a beam deflection arrangement 10 comprises a V or Y-shaped prism 16 having two legs and a foot portion from which the legs extend. The two legs of the prism 16 are mirror coated at their outer surfaces and are joined along the center of the foot portion. Both beam bundles are reflected on the two leg walls when passing through the legs and then exit at the foot end face. A displacement of the two beam paths resulting from the reflection arrangement has to be taken into consideration. But this error is hardly noticeable as it can be easily adjusted by eye adjustment of the viewer on the screen. This displacement can also be corrected by an adjustment of the horizontal phase of the camera electronic system.

Figure 6:
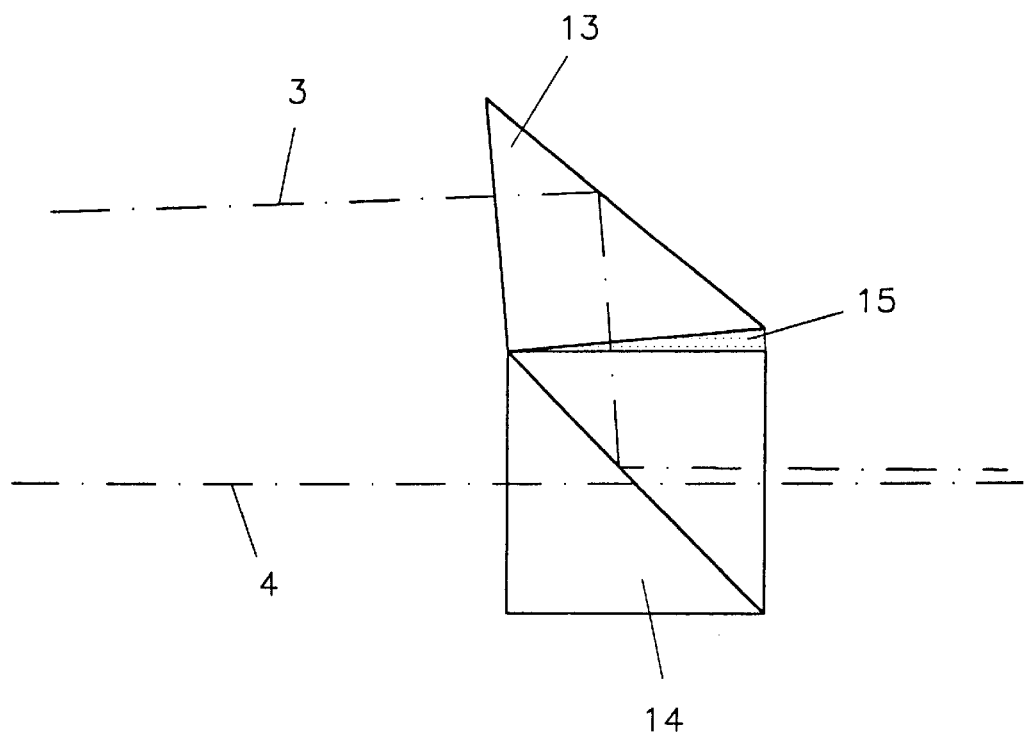
FIG. 6 shows a 90° prism arrangement for one beam and a semitransparent mirror for the other.

FIG. 6 shows the design of the beam deflection arrangement 10 with a 90° reflection prism 13 and a semi-permeable mirror prism 14. Both are disposed on a flat plate oriented, as described above, in accordance with the desired beam path and are fixed in position by an optical cement 15. Differences in intensity in the beam paths can be compensated for by the electronic system of the camera since the optical pattern of the two video half pictures is known. However, symmetry of the intensities can also be obtained in principle by the degree of the coating of the semitransparent mirror.

What is claimed is:

1. A 3D-video endoscope for observing objects or surfaces in cavities, comprising: a shank portion having a front end, two front lenses disposed at the front end of said shank portion and having optical axes intersecting in an area in front of said lenses under a certain squint angle α, a controllable optical switch disposed in the beam path of each lens at said front end of said shank portion and being controlled in the same rhythm so as to be alternately transparent and opaque such that the optical switch in one beam path is transparent when the optical switch in the other is opaque and vice versa, a beam deflection arrangement disposed in the beam paths at said front end of said shank portion after said optical switches for directing said beams onto a single optical axis, an opto-electronic camera disposed in said shank and having a light reception surface disposed on said single optical axis and in the image plane of said front lenses whereby said camera provides electrical output signals representative alternately, in the rhythm of the two optical switches, the picture generated by the one and the other of said front lenses for further video processing, said beam deflection arrangement including a V or Y-shaped beam guide structure having two legs and a foot portion and being so arranged that the beam from one of said front lenses enters one, and the beam from the other of said front lenses enters the other of said legs, said legs being mirror coated at their outer surfaces so as to reflect said beams and direct them both into said foot portion from which they exit said beam deflection arrangement.

\* \* \* \* \*